US012573643B2

(12) United States Patent (10) Patent No.: US 12,573,643 B2
Okabe (45) Date of Patent: Mar. 10, 2026

(54) FUEL CELL SYSTEM

(71) Applicant: HONDA MOTOR CO., LTD., Tokyo (JP)

(72) Inventor: Yuta Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 561 days.

(21) Appl. No.: 18/084,778

(22) Filed: Dec. 20, 2022

(65) Prior Publication Data
US 2023/0207841 A1 Jun. 29, 2023

(30) Foreign Application Priority Data
Dec. 28, 2021 (JP) ................................. 2021-214771

(51) Int. Cl.
| *H01M 8/04029* | (2016.01) |
| *H01M 8/04701* | (2016.01) |
| *H01M 8/22* | (2006.01) |
| *H01M 8/2465* | (2016.01) |

(52) U.S. Cl.
CPC ... *H01M 8/04029* (2013.01); *H01M 8/04701* (2013.01); *H01M 8/22* (2013.01); *H01M 8/2465* (2013.01); *H01M 2250/20* (2013.01)

(58) Field of Classification Search
CPC ......... H01M 8/04029; H01M 8/04701; H01M 8/04708; H01M 8/0432; H01M 8/04619; H01M 8/04768; H01M 8/04507
See application file for complete search history.

(56) References Cited

U.S. PATENT DOCUMENTS

| 6,045,934 A | 4/2000 | Enami |
| 2015/0086887 A1 | 3/2015 | Matsuo et al. |

FOREIGN PATENT DOCUMENTS

| CN | 104205455 A | 12/2014 |
| CN | 112701316 A | 4/2021 |
| JP | H06-251789 A | 9/1994 |
| JP | 2004-349214 A | 12/2004 |
| JP | 2006-185907 A | 7/2006 |
| JP | 2006-339103 A | 12/2006 |
| JP | 2008-053144 | * 3/2008 |
| JP | 2008-053144 A | 3/2008 |
| JP | 2008-258040 A | 10/2008 |
| JP | 2010-020924 A | 1/2010 |
| JP | 2014-120336 A | 6/2014 |
| KR | 10-1679975 B1 | 11/2016 |
| WO | 2006/059776 A2 | 6/2006 |

OTHER PUBLICATIONS

Office Action dated Sep. 5, 2023 issued over the corresponding Japanese Patent Application No. 2021-214771 with the English machine translation thereof.
Office Action and Search Report dated Dec. 17, 2025 issued in the corresponding Chinese Patent Application No. 202211695542.6 with the English machine translation thereof.

* cited by examiner

*Primary Examiner* — Brittany L Raymond

(74) *Attorney, Agent, or Firm* — Carrier, Shende & Associates P.C.; Joseph P. Carrier; Fulchand P. Shende

(57) ABSTRACT

At low temperature, a temperature regulator regulates a flow rate of a coolant to the water-cooled intercooler such that the temperature of the oxygen-containing gas (supercharged air) supplied from the oxygen-containing gas supply machine to the oxygen-containing gas inlet of the fuel cell stack increases as the generated electric power by the fuel cell stack increases (characteristic in FIG. 2).

9 Claims, 7 Drawing Sheets

FUEL CELL SYSTEM

CROSS-REFERENCE TO RELATED APPLICATIONS

This application is based upon and claims the benefit of priority from Japanese Patent Application No. 2021-214771 filed on Dec. 28, 2021, the contents of which are incorporated herein by reference.

BACKGROUND OF THE INVENTION

Field of the Invention

The present invention relates to a fuel cell system including a fuel cell stack for generating electric power by electrochemical reactions between a fuel gas and an oxygen-containing gas. The fuel cell system according to the present invention is suitably mounted on a mobile body such as a fuel cell vehicle.

Description of the Related Art

In recent years, a fuel cell vehicle (FCV) using hydrogen as fuel has attracted attention as an automobile having a small environmental load in place of a gasoline-powered automobile. A fuel cell vehicle supplies air (including oxygen) and hydrogen gas as a fuel gas to a fuel cell. A fuel cell vehicle travels by driving an electric motor using electric power generated by a fuel cell. For this reason, the fuel cell vehicle does not discharge carbon dioxide ($CO_2$), NOx, SOx, and the like as a gasoline-powered automobile does, but discharges only water, and thus is considered to be an environmentally friendly vehicle.

For example, JP 2014-120336 A discloses a fuel cell system in which a high-temperature oxygen-containing gas compressed by a supercharger is cooled by an air-cooled intercooler and then cooled by a water-cooled intercooler, and the oxygen-containing gas cooled by the water-cooled intercooler is humidified by a humidifier and supplied to a fuel cell stack (FIG. 1 of JP 2014-120336 A).

In this fuel cell system, in order to suppress supercooling of the oxygen-containing gas by the air-cooled intercooler in a low load region of the fuel cell stack at the time of start-up or the like, a bypass flow field that bypasses the oxygen-containing gas is provided in parallel with the air-cooled intercooler.

SUMMARY OF THE INVENTION

In the fuel cell system in which such a bypass flow field is not provided in parallel, the cooled and humidified oxygen-containing gas is supplied to the cathode flow field in the fuel cell stack in a low temperature environment, so that the moisture condenses in the fuel cell stack. When the amount of condensed water (droplets) due to condensation increases, flooding occurs in the cathode flow field.

The occurrence of flooding affects the electrochemical reaction (power generation reaction) in the fuel cell stack and reduces power generation efficiency of the fuel cell stack. An object of the present invention is to solve the aforementioned problem.

According to an aspect of the present invention, there is provided a fuel cell system including a fuel cell stack configured to generate electric power by an electrochemical reaction between a fuel gas and an oxygen-containing gas, an oxygen-containing gas supply machine configured to supply the oxygen-containing gas to the fuel cell stack, a temperature regulator configured to regulate a temperature of the oxygen-containing gas supplied by the oxygen-containing gas supply machine, an external temperature acquisition unit configured to acquire an external temperature of the fuel cell stack, and a generated electric power acquisition unit configured to acquire generated electric power of the fuel cell stack, wherein the temperature regulator regulates the temperature of the oxygen-containing gas in a manner that, in a case where the generated electric power is equal to or higher than a predetermined value, the temperature of the oxygen-containing gas becomes higher as the generated electric power increases.

According to another aspect of the present invention, there is provided a fuel cell system including a fuel cell stack configured to generate electric power by an electrochemical reaction between a fuel gas and an oxygen-containing gas, an oxygen-containing gas supply machine configured to supply the oxygen-containing gas to the fuel cell stack, a temperature regulator configured to regulate a temperature of the oxygen-containing gas supplied by the oxygen-containing gas supply machine, an external temperature acquisition unit configured to acquire an external temperature of the fuel cell stack, and a generated electric power acquisition unit configured to acquire generated electric power of the fuel cell stack, wherein the temperature regulator regulates the temperature of the oxygen-containing gas in a manner that, in a case where the external temperature is lower than a predetermined temperature, the temperature of the oxygen-containing gas becomes higher as the generated electric power increases.

According to the present invention, it is possible to suppress the occurrence of condensation in the cathode flow field due to the temperature difference between the internal temperature of the fuel cell stack and the oxygen-containing gas which is the supercharged air supplied to the fuel cell stack, to prevent the occurrence of flooding in the cathode flow field, and to eliminate the deterioration of the power generation efficiency of the fuel cell stack.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

[Configuration]

Figure 1:
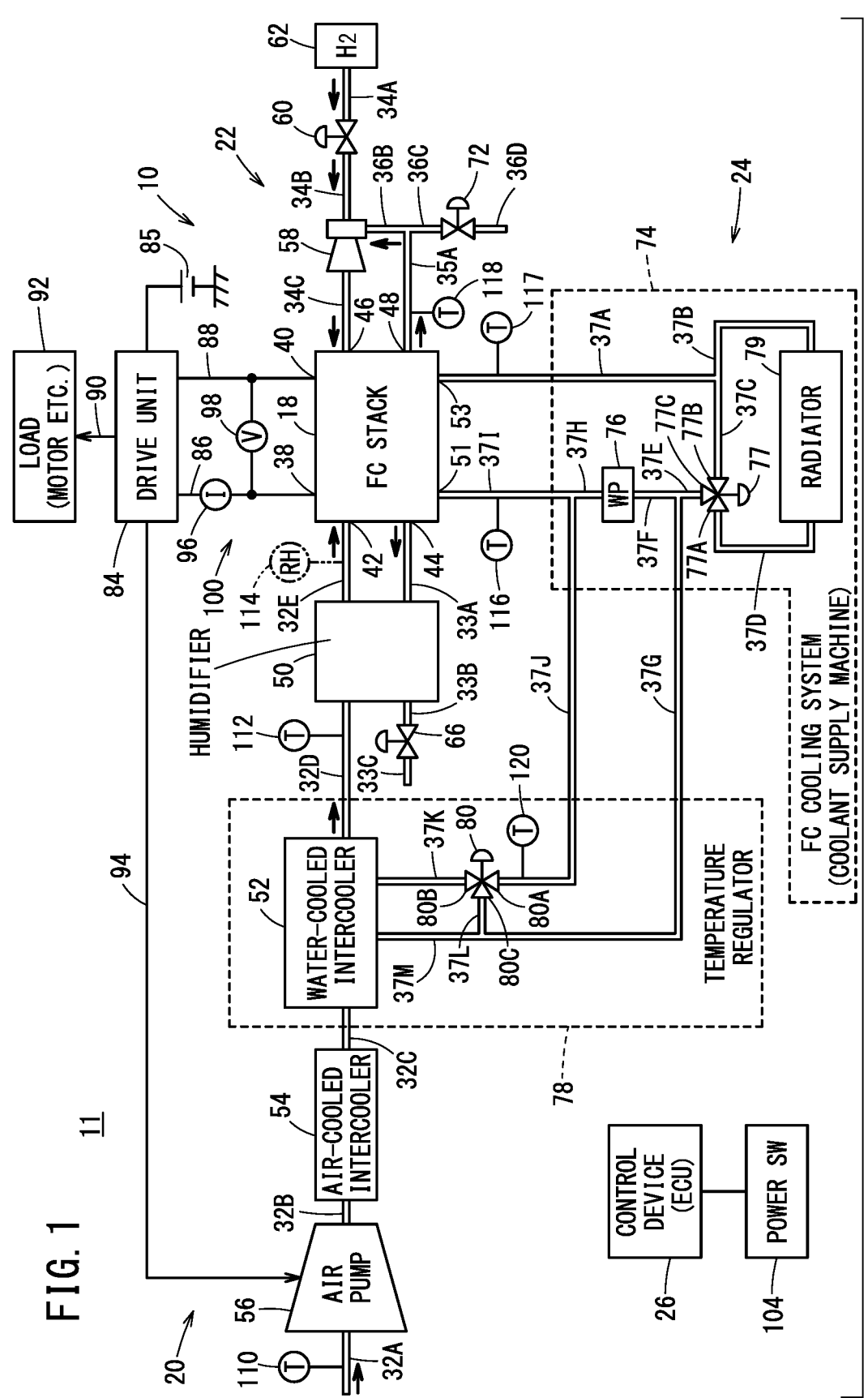
FIG. 1 is a schematic diagram illustrating a configuration of a fuel cell vehicle equipped with a fuel cell system according to an embodiment.

FIG. 1 is a schematic diagram illustrating a configuration of a fuel cell vehicle 11 equipped with a fuel cell system 10 according to an embodiment. In addition to the fuel cell system 10, the fuel cell vehicle 11 includes a drive unit 84, a high-voltage electrical power storage device 85, a load 92 including a traction motor, and a control device 26 that controls the fuel cell vehicle 11 through a control line (not shown).

The fuel cell system 10 includes a fuel cell stack (fuel cells) 18, an oxygen-containing gas supply device 20, a fuel gas supply device 22, and a coolant supply device 24, in addition to the control device 26 that controls the fuel cell system 10.

The control device 26 may be divided into two or more control devices that respectively control a control device that controls the fuel cell vehicle 11 and a control device that controls the fuel cell system 10.

The oxygen-containing gas supply device 20 includes an air pump (compressor) 56 as an oxygen-containing gas supply apparatus, an air-cooled intercooler 54, a water-cooled intercooler 52, and a humidifier 50 (humidified portion) in the oxygen-containing gas supply pipes 32A to 32E, and includes the humidifier 50 (humidifying portion) and a back pressure valve 66 in oxygen-containing off-gas discharge pipes 33A to 33C.

The oxygen-containing gas supply device 20 takes in air (outside air or ambient air) from the pipe 32A and compresses it with the air pump 56 to have a high temperature (also referred to as supercharged air). The supercharged air is output from the oxygen-containing gas supply device 20. The supercharged air that has been highly compressed to have high temperature is cooled by the air-cooled intercooler 54, and heated or cooled by the water-cooled intercooler 52 to have an appropriate temperature.

The supercharged air adjusted to the appropriate temperature is appropriately humidified by the humidifier 50 and is supplied to an oxygen-containing gas inlet 42 of the fuel cell stack 18.

The air-cooled intercooler 54 is disposed at a front portion of the fuel cell vehicle 11, and cools the oxygen-containing gas by exchanging heat between air from ahead of the fuel cell vehicle 11 and the oxygen-containing gas that has been compressed to have high temperature by the air pump 56. The heating (temperature increasing) process and the cooling process by the water-cooled intercooler 52 will be described later.

The oxygen-containing gas supplied into the fuel cell stack 18 from the oxygen-containing gas inlet 42 flows through a cathode flow field (not shown) in the fuel cell stack 18, is output from an oxygen-containing gas outlet 44 as a highly humid oxygen-containing off-gas, and is supplied to the pipe 33C via the humidifier 50 and the back pressure valve 66.

The humidifier 50 recovers part of the moisture contained in the oxygen-containing off-gas through an internal porous membrane, humidifies the oxygen-containing gas supplied from the water-cooled intercooler 52, and generates the appropriately humidified oxygen-containing gas.

The fuel gas supply device 22 includes a fuel tank (hydrogen tank) 62 as a fuel gas supply machine, a pressure reducing valve 60, and an ejector 58 in fuel gas supply pipes 34A to 34C.

The fuel gas supply device 22 also includes a fuel off-gas communication pipe 35A, a circulation pipe 36B, discharge pipes 36C and 36D, and a purge valve 72. The purge valve 72 is provided between the discharge pipe 36C and the discharge pipe 36D.

The fuel gas supply device 22 reduces the pressure of the fuel gas (hydrogen) supplied from the fuel tank 62 by the pressure reducing valve 60, and supplies the fuel gas to a fuel gas inlet 46 of the fuel cell stack 18 via a drive port and an outlet port of the ejector 58.

The fuel gas supplied from the fuel gas inlet 46 into the fuel cell stack 18 flows through an anode flow field (not shown) in the fuel cell stack 18, and is output as a fuel off-gas from a fuel gas outlet 48 into the pipe 35A.

When the purge valve 72 is closed, the fuel off-gas output to the pipe 35A is supplied to a suction port of the ejector 58 through the pipe 36B.

The ejector 58 suctions the fuel off-gas supplied to the suction port by means of the fuel gas supplied from the drive port, mixes with the fuel gas, outputs the mixed gas from the outlet port, and supplies the mixed gas to the fuel gas inlet 46.

The pipe 33C on the outlet side of the back pressure valve 66 and the pipe 36D on the outlet side of the purge valve 72 communicate with a diluter (not shown). The diluter mixes the oxygen-containing off-gas and the fuel off-gas to dilute the hydrogen concentration to a specified value or less.

Although not shown in the drawings, for example, the fuel cell stack 18 is configured by stacking power generation cells in which membrane electrode assemblies (MEAs) are sandwiched by separators. Each of the membrane electrode assemblies includes a solid polymer electrolyte membrane sandwiched between a cathode and an anode, and a cathode flow field and an anode flow field are formed therein. Separators at both ends of the stacked power generation cells are electrically connected to a positive electrode terminal 38 and a negative electrode terminal 40.

The positive electrode terminal 38 of the fuel cell stack 18 is connected to the drive unit 84 through a wire (electric wire or bus bar) 86, and the negative electrode terminal 40 of the fuel cell stack 18 is connected to the drive unit 84 through a wire (electric wire or bus bar) 88.

In each of the power generation cells of the fuel cell stack 18, the oxygen-containing gas supplied to the cathode through the cathode flow field and the hydrogen gas supplied to the anode through the anode flow field are partially consumed in electrochemical reactions at the electrode catalyst layers to perform electric power generation.

The generated electric power is supplied to the drive unit 84 through the positive electrode wire 86 and the negative electrode wire 88. The drive unit 84 drives a load (including a traction motor for vehicle travelling) 92 through a wire 90 by the supplied electric power and/or the electric power of the electrical power storage device 85, and drives the air pump 56 through a wire 94. The drive unit 84 also charges and discharges the electrical power storage device 85.

A current sensor 96 for measuring the generated current Ifc is inserted in the wire 86, and a voltage sensor 98 for measuring the generated voltage Vfc is disposed across the wire 86 and the wire 88. The current sensor 96 and the voltage sensor 98 constitute a generated electric power acquisition unit 100 that is capable of calculating the generated power (generated electric power) Pfc.

The coolant supply device 24 includes an FC cooling system 74 as a coolant supply machine, and an oxygen-containing gas temperature regulator 78.

The FC cooling system 74 includes a radiator 79, a mixing valve 77, and a coolant pump (WP: water pump) 76 in pipes 37A to 37J through which a liquid coolant such as ethylene glycol or oil flows.

The mixing valve 77 includes an inlet valve 77A, a bypass inlet valve 77B and an outlet valve 77C.

The temperature regulator 78 includes the water-cooled intercooler 52 and a three-way valve 80 as a flow rate regulator in the pipes 37J to 37M and 37G through which the coolant flows. The three-way valve 80 includes an inlet valve 80A and outlet valves 80B, 80C.

At the pipe 32A on the inlet side of the air pump 56, a temperature sensor 110 is provided as an external temperature acquisition unit that measures a temperature Ta of outside air (referred to as ambient temperature or external (outdoor) temperature).

At the pipe 32D on the outlet side of the water-cooled intercooler 52, a temperature sensor 112 is provided as a supercharged air temperature acquisition unit that measures a temperature Tsa [° C.] of the compressed oxygen-containing gas (supercharged air).

At the pipe 37I near a coolant inlet 51 of the fuel cell stack 18, a temperature sensor 116 is provided for measuring a coolant inlet temperature (coolant temperature) Tinc [° C.].

A temperature sensor 117 for measuring a coolant outlet temperature (coolant temperature) Toutc is provided on the pipe 37A near a coolant outlet 53 of the fuel cell stack 18.

A temperature sensor 118 for measuring a temperature (stack temperature) Ts of the fuel cell stack 18 is provided on the pipe 35A near the fuel gas outlet 48 of the fuel cell stack 18. The stack temperature Ts may be replaced with the coolant outlet temperature Toutc.

A temperature sensor 120 for measuring a temperature Tihc of the coolant supplied to the water-cooled intercooler 52 is provided on the pipe 37J near the inlet valve 80A of the three-way valve 80.

A sensor 114 for measuring a humidity Ha [%] of the oxygen-containing gas (humidified supercharged gas) humidified by the humidifier 50 may be provided on the pipe 32E on the outlet side of the humidifier 50.

A power switch 104 for starting, continuing (ON), or terminating (OFF) the power generation operation of the fuel cell stack 18 of the fuel cell system 10 is connected to the control device 26. Also, an accelerator degree of opening sensor, a vehicle speed sensor, and an SOC sensor of the electrical power storage device 85, none of which are shown, are connected to the control device 26.

The control device 26 is configured by an electronic control unit (ECU), and operates as various control units and the like by one or more CPUs executing programs stored in a memory.

The control device 26 executes a program based on the information detected or acquired by the various sensors and the various acquisition units (the ambient temperature Ta, the supercharged air temperature Tsa, the stack temperature Ts & the coolant temperature Toutc, and the coolant temperature Tinc) to regulate the degrees of opening of the pressure reducing valve 60, the back pressure valve 66, the purge valve 72, the mixing valve 77, and the three-way valve 80, each of which is a regulating valve, and controls the air pump 56, the load 92, and the electrical power storage device 85 through the drive unit 84.

[Operation]

In the fuel cell system 10 of the fuel cell vehicle 11 basically configured as described above, a target coolant flow rate supply process (also simply referred to as a coolant supply process) to the water-cooled intercooler 52 will be described. The target coolant flow rate supply process controls (regulates), by heat exchange, the temperature of the oxidant gas supplied as supercharged air from the air pump 56 to the oxygen-containing gas inlet 42 of the fuel cell stack 18. The coolant supply process to the water-cooled intercooler 52 is executed by the control device 26.

Figure 2:
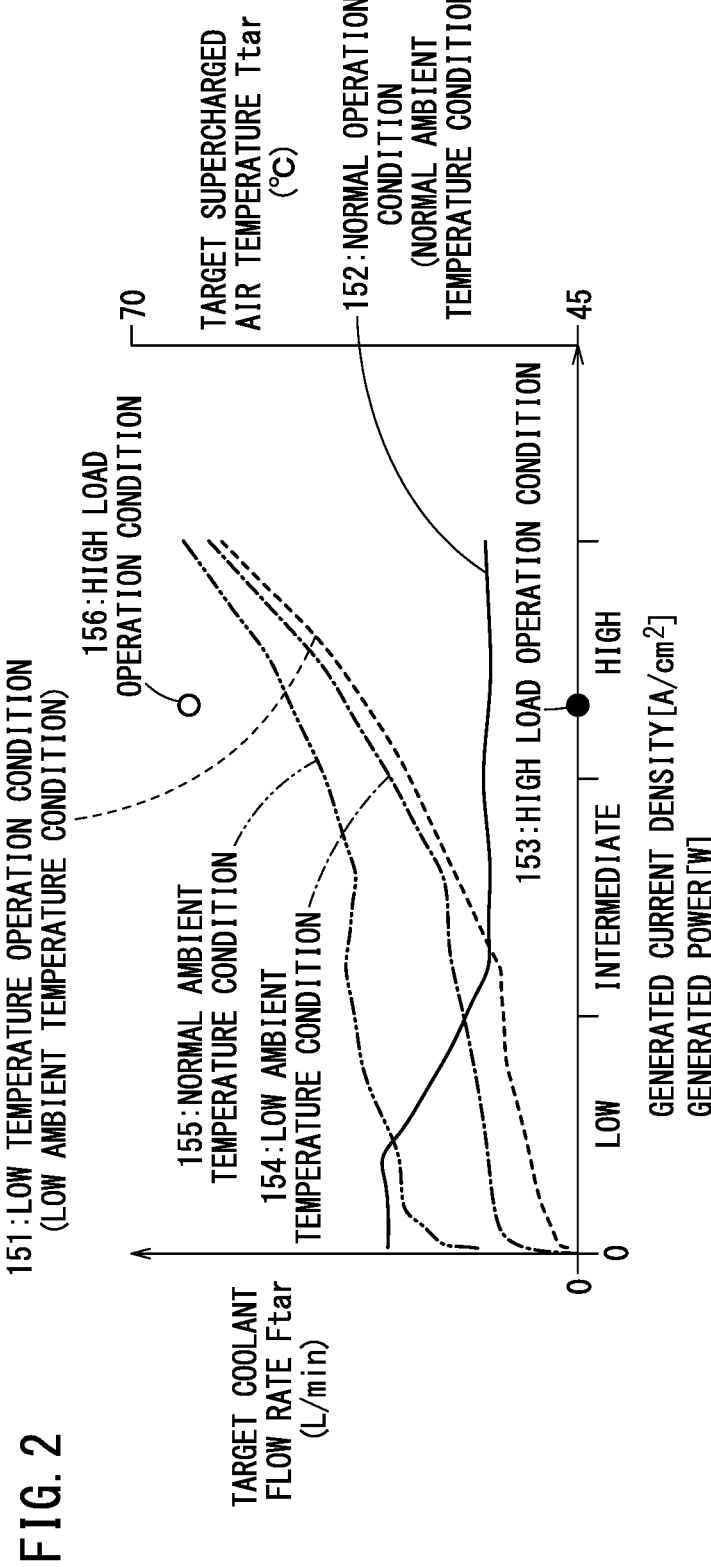
FIG. 2 is a characteristic diagram illustrating a target coolant flow rate and a target supercharging air temperature for each power generation state with respect to a generated current density or a generated power recorded in a storage device of a control device.

FIG. 2 illustrates characteristics 151, 152, and 153 (maps) of target coolant flow rate Ftar [L/min], recorded in advance in the storage device of the control device 26, for each power generation state with respect to the generated current density [A/cm²] or the generated power [W] of the fuel cell stack 18.

FIG. 2 also illustrates characteristics 154, 155, and 156 (maps) of target supercharged air temperature (target oxygen-containing gas temperature) Ttar [° C.] for each power generation state with respect to the generated current density [A/cm²] or the generated power [W].

In FIG. 2, the vertical axis indicates the target coolant flow rate Ftar (0 [L/min] or more) corresponding to the target supercharged air temperature Ttar (in this embodiment, between 45 [° C.] to 70 [° C.]).

In FIG. 2, the generated current density [A/cm²] on the horizontal axis is divided into three sections of a low generated current density, an intermediate generated current density, and a high generated current density.

The control device 26 calculates the generated current density [A/cm²] as a value obtained by dividing the generated current Ifc [A], which is detected by the current sensor 96 and acquired by the control device 26, by a predetermined power generation area (area of the catalytic layer) of the power generation cell.

The control device 26 may replace the generated current density [A/cm²] on the horizontal axis with the generated power [W] obtained by multiplying the generated current density [A/cm²] by the power generation area and further multiplying the resultant by the generated voltage Vfc [V] detected by the voltage sensor 98 and acquired by the control device 26. In this case, the generated power [W] on the horizontal axis is divided into regions of a low generated power, an intermediate generated power, and a high generated power. Here, each power generation state of the characteristics 151 to 153 for determining the target coolant flow rate Ftar will be described.

The characteristic 151 indicated by a broken line indicates the target coolant flow rate Ftar with respect to the generated current density in a power generation state under a low temperature operation condition (low ambient temperature condition), at a certain temperature of 0° C. or less, i.e., below freezing point, for example, about minus several tens of degrees Celsius.

The characteristic 152 indicated by a solid line indicates the target coolant flow rate Ftar with respect to the generated current density in a power generation state under a normal operation condition (normal ambient temperature condition) at normal temperature, in this example, 25 [° C.].

The characteristic (characteristic point) 153 indicated by one black dot indicates the target coolant flow rate Ftar with respect to the generated current density in the power generation state under the high load operation condition of the fuel cell stack 18. Here, the high load operation condition refers to a power generation state in which traveling at a high generated current density (high power [W]) of the fuel cell stack 18 continues for a predetermined time and a large amount of power [kWh] can be consumed, such as when the fuel cell vehicle 11 travels on a constant long uphill or continues to travel at high speed.

Further, the power generation states of the characteristics 154 to 156 for determining the target supercharged air temperature Ttar, which is used instead of determining the target coolant flow rate Ftar, will also be described.

The characteristic 154 indicated by an one-dot-dashed line indicates the target supercharged air temperature Ttar with respect to the generated current density in a power generation state under a low temperature operation condition (low ambient temperature condition), at a certain temperature of 0° C. or less, i.e., below freezing point, for example, about minus several tens of degrees Celsius.

The characteristic 155 indicated by a two-dot-dashed line indicates the target supercharged air temperature Ttar with respect to the generated current density in the power generation state under a normal operation condition (normal ambient temperature condition) at normal temperature, in this example, 25 [° C.].

The characteristic (characteristic point) 156 indicated by one white dot (open dot) indicates the target supercharged air temperature Ttar with respect to the generated current density in the power generation state under the high load operation condition (described above) of the fuel cell stack 18.

Figure 3:
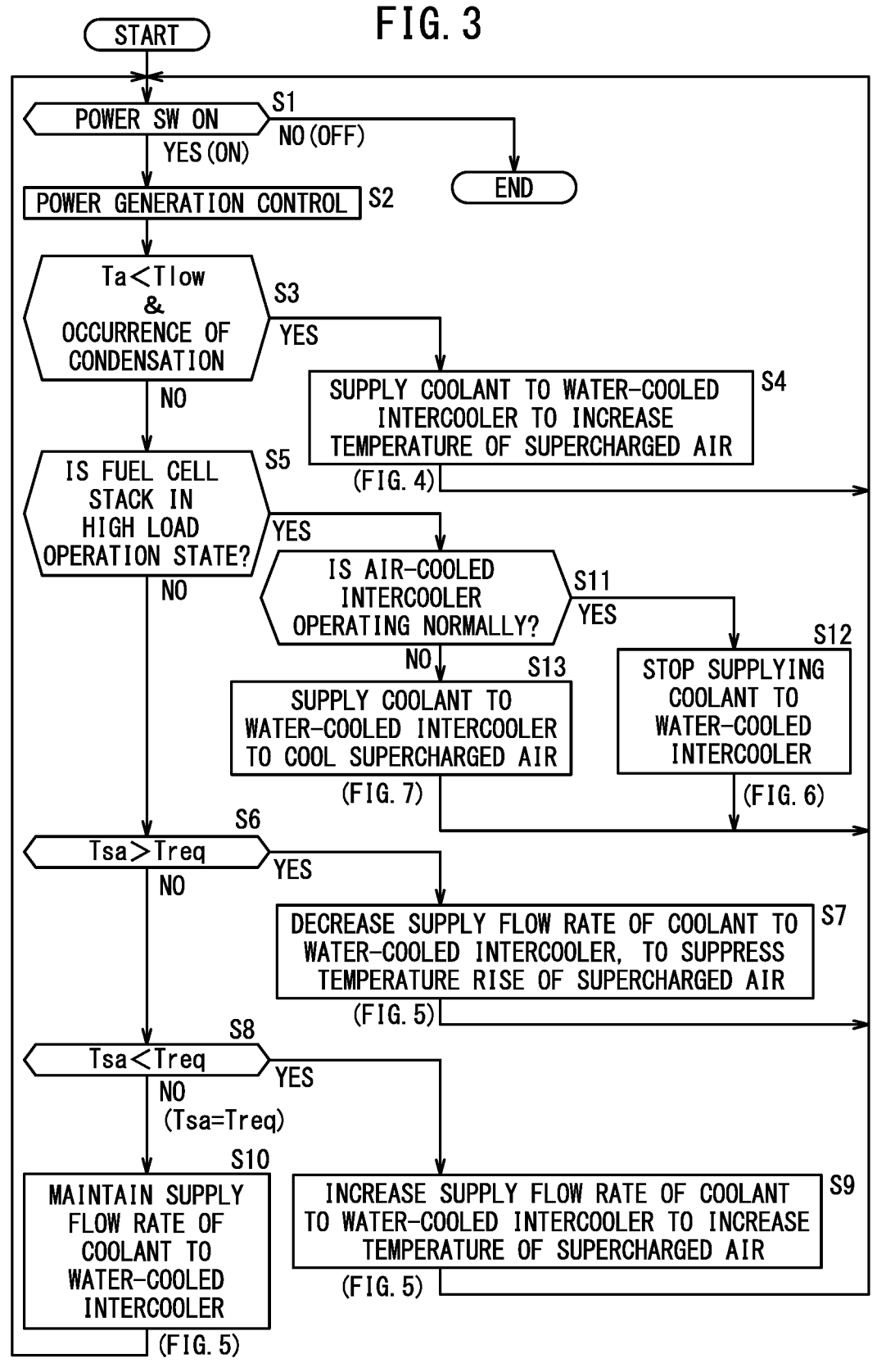
FIG. 3 is a flowchart illustrating a procedure of coolant supply process performed by the control device.

FIG. 3 is a flowchart illustrating a procedure of a coolant supply process for controlling the flow rate of the coolant supplied from the FC cooling system (coolant supply machine) 74 to the water-cooled intercooler 52 of the temperature regulator 78, to the target coolant flow rate Ftar shown in FIG. 2. The coolant supply process according to the flowchart of FIG. 3 is repeatedly executed at a predetermined period by the control device 26.

In step S1, the control device 26 determines whether the power switch 104 is in an ON state or not (OFF state).

When the power switch 104 is in an OFF state (step S1: NO), the control device 26 ends the coolant supply process.

When the power switch 104 is in the ON state (step S1: YES), in step S2, the control device 26 calculates the required generated power Pfcreq for the fuel cell stack 18 based on an accelerator degree of opening, a vehicle speed, a road gradient, and the like. Further, in step S2, the control device 26 controls the oxygen-containing gas supply device 20 including the air pump 56 and the fuel gas supply device 22 including the fuel tank 62, and controls the FC cooling system 74 including the coolant pump 76 and the coolant supply device 24 including the water-cooled intercooler 52, so that the generated power Pfc of the fuel cell stack 18 becomes the calculated required generated power Pfcreq.

In step S3, the control device 26 acquires the external temperature (ambient temperature) Ta [° C.] detected by the temperature sensor 110, the temperature Tsa [° C.] of the oxygen-containing gas (supercharged air) detected by the temperature sensor 112, and the coolant outlet temperature Toutc indicating the stack temperature Ts.

In Step S3, the control device 26 calculates an estimated temperature of the cathode flow field in the fuel cell stack 18, based on the coolant outlet temperature Toutc [° C.] acquired by the temperature sensor 117.

Further, in step S3, the control device 26 determines whether or not the ambient temperature Ta is lower than a predetermined low temperature threshold Tlow (for example, Tlow=0 [ ° C.]), and determines whether or not condensation occurs in the cathode flow field in the fuel cell stack 18 based on the coolant outlet temperature Toutc and the supercharged air temperature Tsa (the estimated temperature of the cathode flow field in the fuel cell stack 18).

If the control device 26 determines that the ambient temperature Ta is lower than the low temperature threshold Tlow and condensation occurs in the cathode flow field (step S3: YES), the coolant supply process proceeds to step S4.

In step S4, the control device 26 acquires the target coolant flow rate Ftar with reference to the characteristic 151 of the low temperature operation condition (low ambient temperature condition), increases the temperature of the supercharged air by supplying the coolant of the target coolant flow rate Ftar from the FC cooling system 74 to the water-cooled intercooler 52, and proceeds to step S1.

In step S4, as indicated by the characteristic 154, when the ambient temperature Ta, which is external temperature, is lower than a predetermined temperature (low temperature threshold Tlow) such as the freezing point, the temperature Tsa of the supercharged air (oxygen-containing gas) supplied to the fuel cell stack 18 is regulated to increase as the generated power increases (at least as the generated power increases from a predetermined power in the intermediate generated power).

In this way, when the ambient temperature Ta is low, the control device 26 heats (or increases the temperature of) the supercharged air by the water-cooled intercooler 52. As a result, even at low temperature, it is possible to suppress the occurrence of condensation due to the temperature difference between the internal temperature of the fuel cell stack 18 and the temperature Tsa of the supercharged air (oxygen-containing gas) supplied to the fuel cell stack 18. Therefore, even at low temperature, it is possible to eliminate a decrease in the power generation efficiency of the fuel cell stack 18. Since the occurrence of condensation in the fuel cell stack 18 is suppressed, the occurrence of flooding in the cathode flow field is suppressed.

Figure 4:
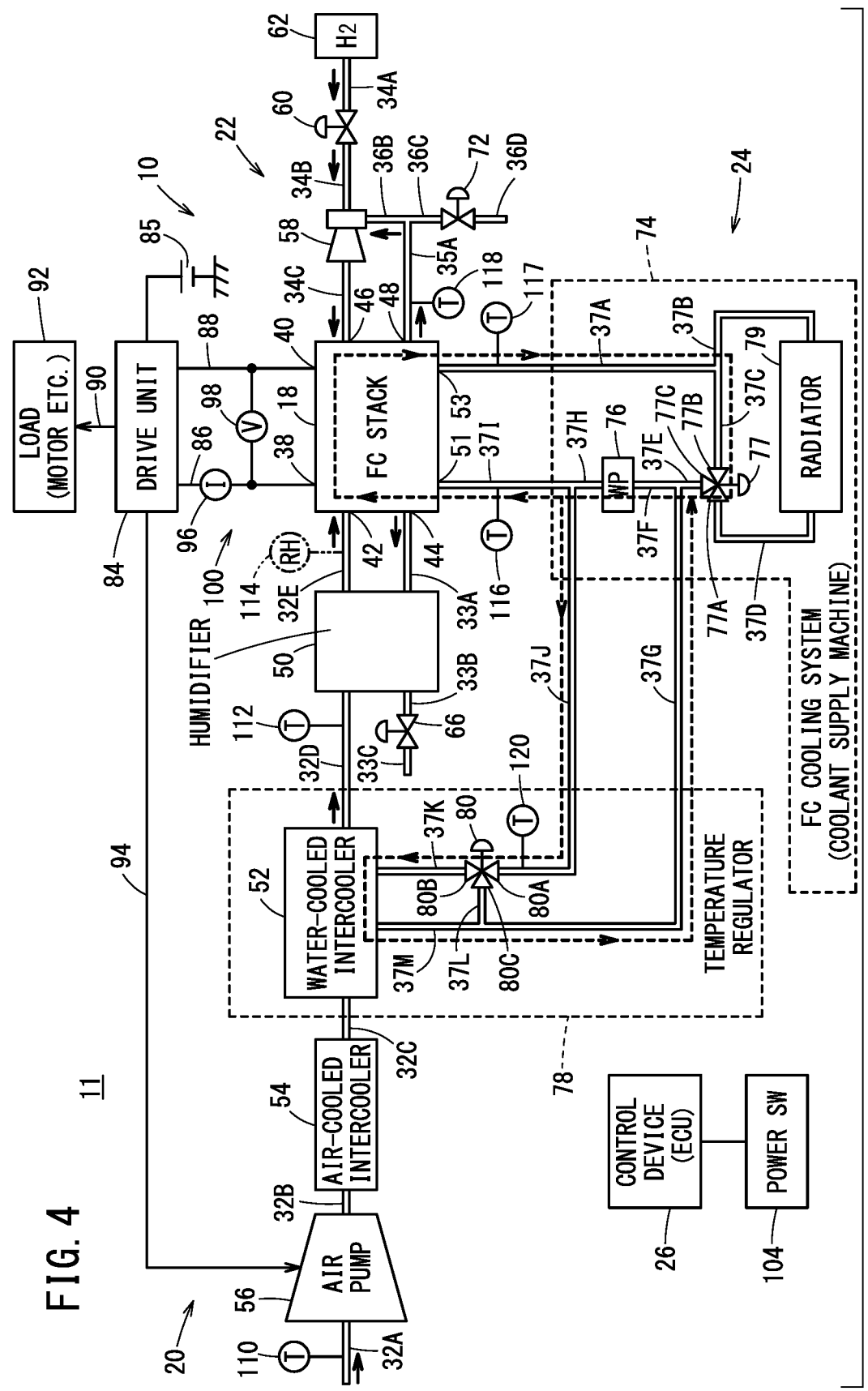
FIG. 4 is an explanatory view illustrating a flow of the coolant by broken lines when external temperature is low.

In FIG. 4, the flow (path) of the coolant in the fuel cell system 10 is indicated by thick broken lines and arrows if the temperature of the supercharged air is raised by the water-cooled intercooler 52 in step S4.

As indicated by the broken lines and arrows in FIG. 4, the coolant, the temperature of which is increased in the fuel cell stack 18 by the reaction heat in the fuel cell stack 18, is output from the coolant outlet 53. Then, the output coolant flows through the pipe 37A, the pipe (bypass pipe) 37C that bypasses the radiator 79, the inlet valves 77B and the outlet valves 77C of the mixing valve 77, and the pipe 37F to the operating coolant pump 76. The coolant branched to the pipe 37J side through the pipe 37H is supplied into the water-cooled intercooler 52 through the inlet valve 80A and the outlet valve 80B of the three-way valve 80 and the pipe 37K. The coolant exchanges heat with the supercharged air inside the water-cooled intercooler 52 to raise the temperature of the supercharged air.

During the process of step S4, the flow rate ratio between the outlet valve 80B and the outlet valve 80C of the three-way valve 80 is regulated to 100[%] and 0[%], respectively, by the control device 26.

The coolant whose temperature is lowered by raising the temperature of the supercharged air in the water-cooled intercooler 52 flows to the pipe 37F through the pipes 37M and 37G. The cooled coolant is mixed with the coolant heated by the reaction heat in the fuel cell stack 18 in the pipe 37F, suctioned into the coolant pump 76, and output from the coolant pump 76 as a heated coolant.

On the other hand, if it is determined that condensation does not occur (step S3: NO) even when the ambient temperature Ta is equal to or higher than the low temperature threshold Tlow or the ambient temperature Ta is lower than the low temperature threshold Tlow, the coolant supply process proceeds to step S5.

In step S5, the control device 26 determines whether or not the fuel cell stack 18 is in the high load operation state (see FIG. 2), which means that the generated power Pfc [W] of the fuel cell stack 18 acquired by the generated electric power acquisition unit 100 continues to stay in the high generated power region for a predetermined time.

When the fuel cell vehicle 11 is not in the high load operation state of the fuel cell stack 18 (for example, during travelling on a long uphill) (step S5: NO) but in an operation state with a medium load or less (referred to as a normal operation state), the coolant supply process proceeds to step S6.

In step S6, the control device 26 determines whether or not the temperature Tsa of the supercharged air acquired by the temperature sensors 112 is higher than a required temperature (high efficiency power generation required temperature) Treq at which the fuel cell stack 18 can perform high efficiency power generation.

When the temperature is higher than the high efficiency power generation required temperature Treq (step S6: YES), the coolant supply process proceeds to step S7. When the temperature does not exceed the high efficiency power generation required temperature Treq (step S6: NO), the coolant supply process proceeds to step S8.

In step S7, the control device 26 regulates the flow rate ratio of the outlet valves 80B and 80C of the three-way valve 80, so that the outlet valve 80B side decreases by a certain amount and the outlet valve 80C side increases by a certain amount, in order to suppress the temperature rise of the supercharged air.

Figure 5:
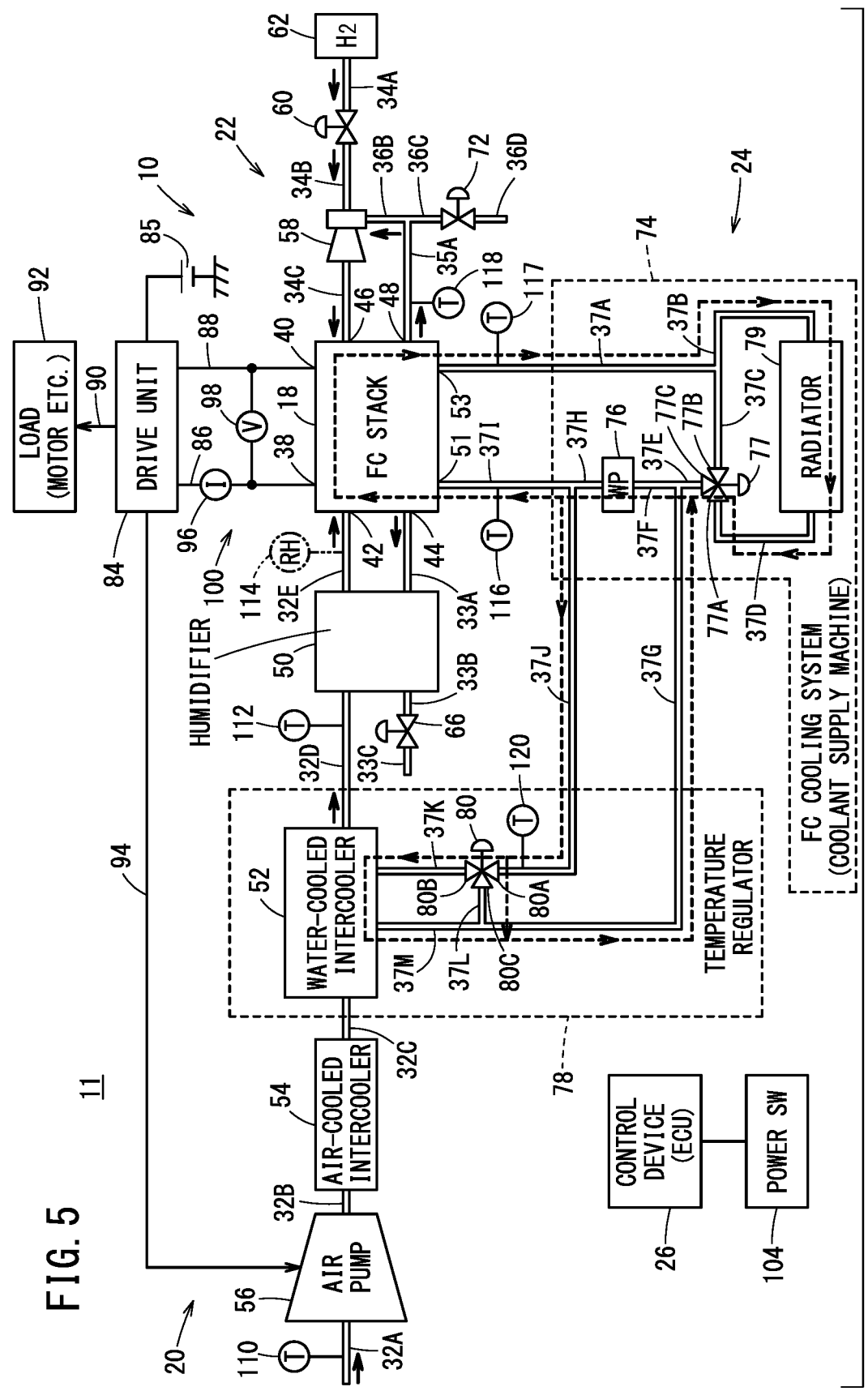
FIG. 5 is an explanatory view illustrating a flow of the coolant by broken lines when external temperature is normal.

In FIG. 5, the flow of the coolant after the process of step S7 is indicated by broken lines and arrows. According to FIG. 5, as compared with FIG. 4, the coolant also flows to the outlet valve 80C which is not used for heating by the water-cooled intercooler 52. In addition, the temperature of the coolant supplied from the FC cooling system 74 to the water-cooled intercooler 52 of the temperature regulator 78 can be controlled based on the heat radiation by the radiator 79 and the ratio of opening degrees of the input valves in the mixing valve 77.

By regulating the coolant flow rate of the three-way valve 80 in step S7, the coolant flow rate supplied to the water-cooled intercooler 52 is reduced, and the temperature rise of the supercharged air passing through the water-cooled intercooler 52 can be suppressed.

In step S8, the control device 26 determines whether or not the temperature Tsa of the supercharged air acquired by the temperature sensor 112 is lower than the high efficiency power generation required temperature Treq of the fuel cell stack 18.

When the temperature Tsa is lower than the high efficiency power generation required temperature Treq (step S8: YES), the coolant supply process proceeds to step S9, and when the temperature is equal to the required temperature Treq (step S8: YES), the control process proceeds to step S10.

In step S9, in order to increase the temperature of the supercharged air by the water-cooled intercooler 52, the control device 26 regulates the flow rate ratio between the outlet valves 80B and 80C of the three-way valve 80 so that the flow rate on the outlet valve 80B side is increased by a certain amount and the flow rate on the outlet valve 80C side is decreased by a certain amount. In practice, the control device 26 controls the output flow rate of the coolant pump 76 and the flow rate ratio of the three-way valve 80 such that the target coolant flow rate Ftar to the water-cooled intercooler 52 is achieved with reference to the characteristic 152 of normal operation (at normal ambient temperature).

By regulating the flow rate of the coolant by the three-way valve 80 in step S9, the flow rate of the coolant supplied to the water-cooled intercooler 52 is increased, the temperature of the supercharged air is raised, and the supercharged air temperature Tsa is raised.

In step S10, since Tsa=Treq, the control device 26 maintains the target supply flow rate of the coolant to the water-cooled intercooler 52, and returns to step S1.

The processes of steps S6 to S10 are performed when the fuel cell stack 18 is under a medium load, and the temperature of the supercharged air supplied to the humidifier 50 can be regulated by the water-cooled intercooler 52 by adjusting the degree of opening of the three-way valve 80.

When the determination in step S5 is affirmative (step S5: YES), in other words, when the fuel cell stack 18 is in the high load operation state, first, in step S11, the control device 26 determines whether the air-cooled intercooler 54 is operating normally or not (operating abnormally).

The abnormality of the air-cooled intercooler 54 determined by the control device 26 can be determined by an abnormal increase in the temperature Tsa of the supercharged air acquired by the temperature sensor 112 even when the water-cooled intercooler 52 is controlled at the target coolant flow rate Ftar.

Figure 6:
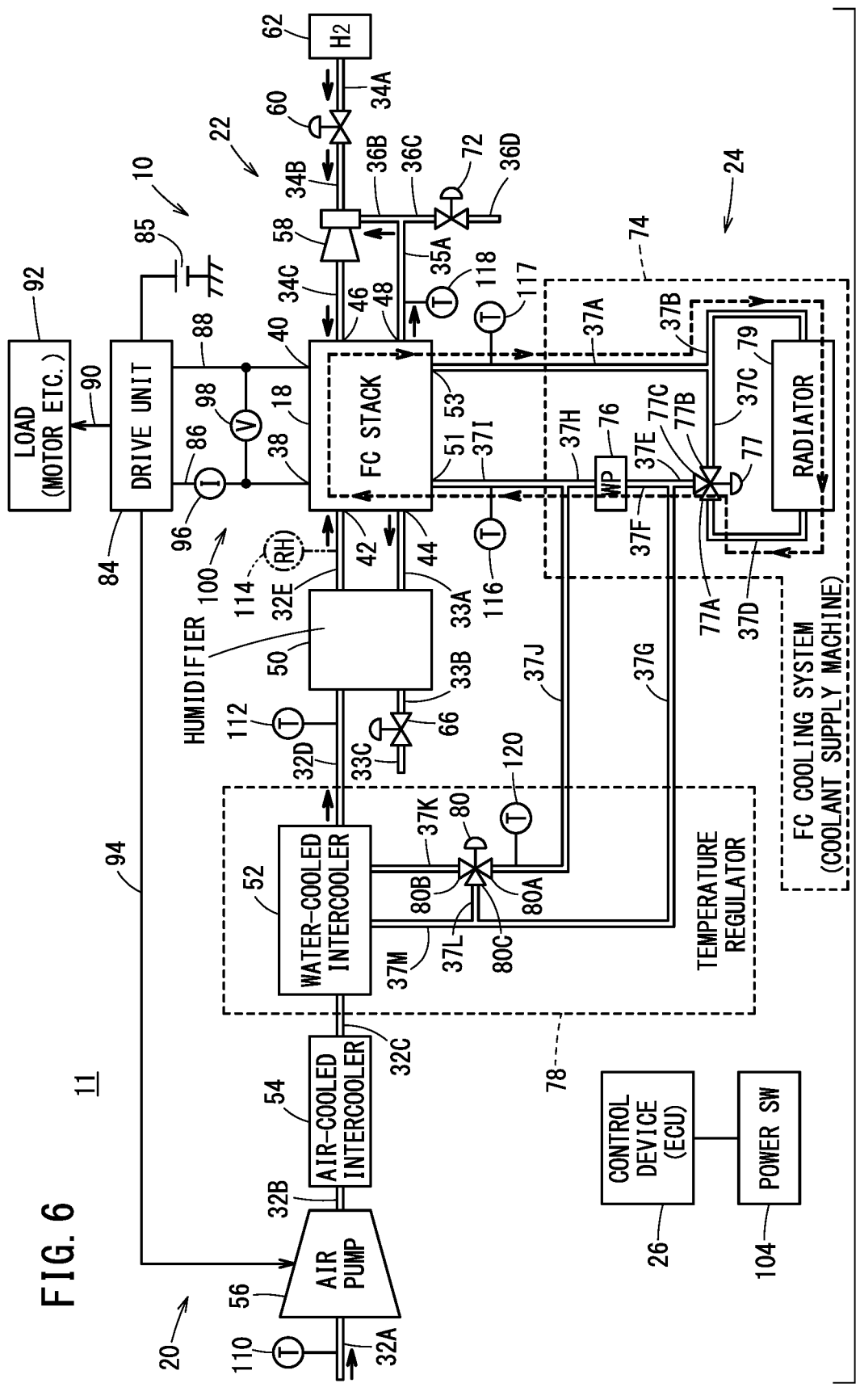
FIG. 6 is an explanatory view illustrating, by broken lines, the flow of the coolant when the air-cooled intercooler is operating abnormally in a high load operation state of the fuel cell stack.

If it is determined that the air-cooled intercooler 54 is operating normally (step S11: YES), in step S12, as shown in FIG. 6, the control device 26 sets the opening degree of the outlet valve 80B to 0[%] and the opening degree of the outlet valve 80C to 100[%], of the three-way valve 80, and stops the heating control (heat exchange) of the supercharged air by the water-cooled intercooler 52. In this case, as indicated by the characteristic 153 in FIG. 2, the target coolant flow rate Ftar is set to 0.

Thus, when the fuel cell stack 18 is under a high load, the inflow of the coolant from the three-way valve 80 to the water-cooled intercooler 52 is blocked. Thus, it is possible to prevent the temperature of the supercharged air that has been cooled by the normal air-cooled intercooler 54 from being raised again by the water-cooled intercooler 52. As a result, it is possible to maintain the supercharged air temperature Tsa at an appropriate temperature which is not too high and which allows the humidifier 50 to satisfactorily perform humidification between the humid oxygen-containing off-gas (humidifying gas) discharged from the oxygen-containing gas outlet 44 of the fuel cell stack 18 and the supercharged air (gas to be humidified, which is dry air).

Figure 7:
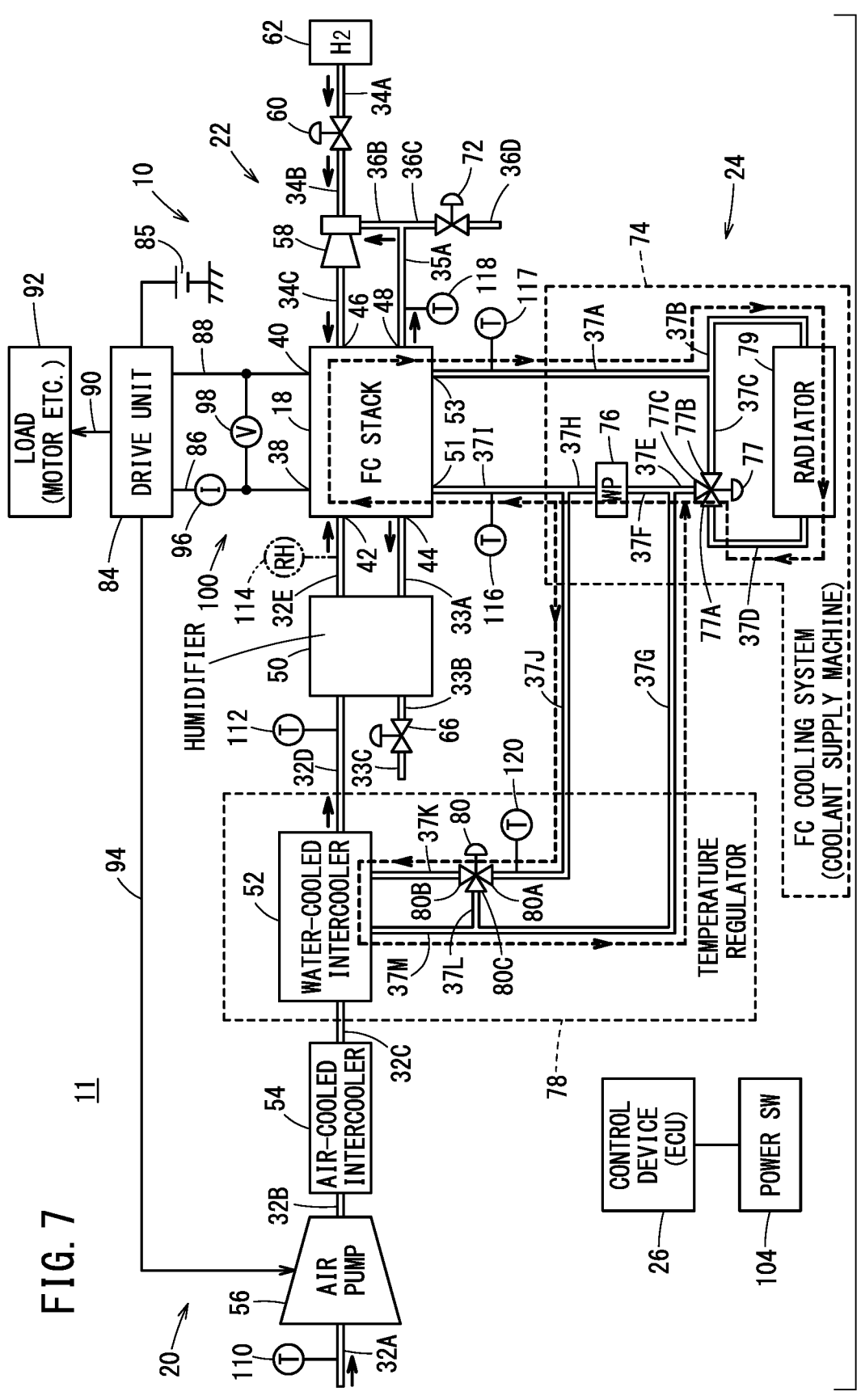
FIG. 7 is an explanatory view illustrating, by broken lines, the flow of the coolant when the air-cooled intercooler is operating normally in the high load operation state of the fuel cell stack.

On the other hand, if it is determined that the air-cooled intercooler 54 is not operating normally (step S11: NO), in step S13, as shown in FIG. 7, the control device 26 sets the opening degree of the outlet valve 80B to 100[%] and the opening degree of the outlet valve 80C to 0[%], of the three-way valve 80, and performs temperature control (heat exchange) for cooling the supercharged air by the water-cooled intercooler 52.

By this temperature control, even if the air-cooled intercooler 54 is abnormal and the function of the air-cooled intercooler 54 is lost, it is possible to prevent thermal damage such as thermal destruction of the humidifier 50 and the fuel cell stack 18 which are components on the downstream side of the water-cooled intercooler 52.

Although the three-way valve 80 and the mixing valve 77 each having a variable flow rate ratio are used in the above embodiment, the flow rate ratio can also be varied by constituting each of them by two ON/OFF valves and adjusting the duty ratio of each of the ON/OFF valves.

Modification 1

The flow rate ratio between the outlet valves 80B and 80C of the three-way valve 80 serving as a flow rate regulator may be controlled as follows.

Based on the difference between the target temperature (target supercharged air temperature Ttar) of the oxygen-containing gas set based on the generated electric power Pfc of the fuel cell stack 18 or the humidification state of the humidifier 50 and the actual temperature Tsa acquired by the oxygen-containing gas temperature sensor 112, the actual temperature Tsa is controlled to become the target supercharged air temperature Ttar. For this purpose, the flow rate of the coolant supplied from the FC cooling system 74 as the coolant supply machine to the water-cooled intercooler 52 as a liquid-cooled heat exchanger via the three-way valve 80 may be regulated.

The humidification state of the humidifier 50 can be determined based on whether or not condensation of water occurs in the cathode flow field, which is determined based on, for example, the coolant outlet temperature Toutc and the supercharged air temperature Tsa, or the humidity Ha acquired by the humidity sensor 114.

According to the first modification, the actual temperature Tsa of the oxygen-containing gas can be regulated to an appropriate temperature, and the power generation efficiency of the fuel cell stack 18 can be increased.

Modification 2

The processes of step S2 and thereafter in the flowchart of FIG. 3 may be performed after completion of the warm-up control of the fuel cell system 10 until the fuel cell vehicle 11 becomes ready to travel with the generated power Pfc of the fuel cell stack 18 when the outside air temperature Ta is low, specifically, below freezing point. In this way, the temperature Tsa of the oxygen-containing gas (supercharged air) supplied to the fuel cell stack 18 can be controlled to be an appropriate temperature by using the reaction heat of the fuel cell stack 18 without using another heater.

Invention that can be Understood from Embodiment and Modifications

Next, the invention understood from the above embodiment and modifications will be described below. Although to facilitate understanding, some of the constituent elements are designated by the reference numerals used in the above-described embodiment, the constituent elements are not limited to those elements to which such reference numerals are applied.

(1) The fuel cell system 10 includes the fuel cell stack 18 configured to generate electric power by an electrochemical reaction between the fuel gas and the oxygen-containing gas, the oxygen-containing gas supply machine configured to supply the oxygen-containing gas to the fuel cell stack, the temperature regulator 78 configured to regulate a temperature of the oxygen-containing gas supplied by the oxygen-containing gas supply machine, the external temperature acquisition unit configured to acquire an external temperature of the fuel cell stack, and the generated electric power acquisition unit 100 configured to acquire generated electric power of the fuel cell stack, wherein the temperature regulator regulates the temperature of the oxygen-containing gas in a manner that, in the case where the generated electric power is equal to or higher than a predetermined value, the temperature of the oxygen-containing gas becomes higher as the generated electric power increases (see the characteristic 154).

According to the present invention, it is possible to suppress the occurrence of condensation in the cathode flow field due to the temperature difference between the internal temperature of the fuel cell stack and the oxygen-containing gas which is the supercharged air supplied to the fuel cell stack, to prevent the occurrence of flooding in the cathode flow field, and to eliminate the deterioration of the power generation efficiency of the fuel cell stack.

(2) The fuel cell system includes the fuel cell stack configured to generate electric power by an electrochemical reaction between the fuel gas and the oxygen-containing gas, the oxygen-containing gas supply machine configured to supply the oxygen-containing gas to the fuel cell stack; the temperature regulator configured to regulate a temperature of the oxygen-containing gas supplied by the oxygen-containing gas supply machine, the external temperature acquisition unit configured to acquire an external temperature of the fuel cell stack, and the generated electric power acquisition unit configured to acquire generated electric power of the fuel cell stack, wherein the temperature regulator regulates the temperature of the oxygen-containing gas in a manner that, in the case where the external temperature is lower than a predetermined temperature, the temperature of the oxygen-containing gas becomes higher as the generated electric power increases (see the characteristic 154).

According to the present invention, it is possible to suppress the occurrence of condensation in the cathode flow field due to the temperature difference between the internal temperature of the fuel cell stack and the oxygen-containing gas which is the supercharged air supplied to the fuel cell stack, to prevent the occurrence of flooding in the cathode flow field, and to eliminate the deterioration of the power generation efficiency of the fuel cell stack.

(3) The fuel cell system according to the present invention further includes the coolant supply machine 74 configured to supply the coolant for temperature regulation to the fuel cell stack, wherein the temperature regulator includes the liquid-cooled heat exchanger provided in the gas pipe through which the oxygen-containing gas output from the oxygen-containing gas supply machine is supplied to the fuel cell stack, the pipe 37K through which the coolant output from the coolant supply machine flows to the liquid-cooled heat exchanger, and the flow rate regulator configured to regulate a flow rate of the coolant flowing through the pipe.

According to the present invention, since the coolant supply machine for regulating the temperature of the fuel cell stack can also be used for regulating the temperature of the oxygen-containing gas, the number of components of the fuel cell system can be reduced and the cost can be reduced.

(4) In the fuel cell system according to the present invention, the flow rate regulator regulates the flow rate of the coolant in a manner that, in the case where the external temperature is equal to or lower than the predetermined temperature and if the generated electric power is equal to or higher than a predetermined value, the flow rate of the coolant supplied from the coolant supply machine to the liquid-cooled heat exchanger is increased.

According to the present invention, in the case where the external temperature is equal to or lower than the predetermined temperature and the generated electric power is equal to or higher than the predetermined value, the flow rate of the coolant supplied from the coolant supply machine to the liquid-cooled heat exchanger is regulated to be increased as the generated electric power increases. In this case, since the flow rate of the coolant heated by the reaction heat generated by the electrochemical reaction of the fuel cell stack is increased, the oxygen-containing gas can be effectively warmed up by the liquid-cooled heat exchanger. As a result, generation of droplets in the fuel cell stack due to a temperature difference between the fuel cell stack and the oxygen-containing gas can be suppressed.

(5) In the fuel cell system according to the present invention, the flow rate regulator regulates the flow rate of the coolant in a manner that, in a case where the external temperature is higher than the predetermined temperature, the flow rate of the coolant supplied from the coolant supply machine to the liquid-cooled heat exchanger is decreased as the generated electric power by the fuel cell stack is increased.

According to the present invention, when the external temperature is higher than the predetermined temperature and the temperature of the oxygen-containing gas supplied to the fuel cell stack is high, the temperature difference between the oxygen-containing gas and the fuel cell stack is small and the possibility of generation of liquid droplets is small. Thus, by decreasing the coolant flow rate supplied to the liquid-cooled heat exchanger, it is possible to supply the oxygen-containing gas at appropriate temperature to the fuel cell stack, and to improve the power generation efficiency.

(6) The fuel cell system according to the present invention further includes the oxygen-containing gas temperature sensor 112 configured to acquire an actual temperature of the oxygen-containing gas supplied from the liquid-cooled heat exchanger to the fuel cell stack through the gas pipe, and the humidifier 50 provided in the gas pipe and configured to humidify the oxygen-containing gas, wherein the flow rate regulator regulates the flow rate of the coolant supplied from the coolant supply machine to the liquid-cooled heat exchanger, based on a difference between a target temperature of the oxygen-containing gas set based on the generated electric power of the fuel cell stack or a humidification state of the humidifier and the actual temperature acquired by the oxygen-containing gas temperature sensor.

According to the present invention, since the flow rate of the coolant supplied from the coolant supply device to the liquid-cooled heat exchanger is regulated based on the difference between the target temperature of the oxygen-containing gas and the actual temperature acquired by the oxygen-containing gas temperature sensor, the actual temperature of the coolant supply machine can be regulated to an appropriate temperature, and the power generation efficiency of the fuel cell stack can be improved.

The present invention is not limited to the above-described embodiment, and various configurations could be adopted therein without deviating from the essence and gist of the present invention.

The invention claimed is:

1. A fuel cell system comprising:
a fuel cell stack configured to generate electric power by an electrochemical reaction between a fuel gas and an oxygen-containing gas;
an oxygen-containing gas supply machine configured to supply the oxygen-containing gas to the fuel cell stack;
a temperature regulator configured to regulate a temperature of the oxygen-containing gas supplied by the oxygen-containing gas supply machine;
an external temperature acquisition unit configured to acquire an external temperature of the fuel cell stack;

a generated electric power acquisition unit configured to acquire generated electric power of the fuel cell stack; and
a coolant supply machine configured to supply a coolant for temperature regulation to the fuel cell stack,
wherein the temperature regulator includes:
a liquid-cooled heat exchanger provided in a gas pipe through which the oxygen-containing gas output from the oxygen-containing gas supply machine is supplied to the fuel cell stack;
a pipe through which a part of the coolant output from the coolant supply machine to the fuel cell stack flows to the liquid-cooled heat exchanger; and
a flow rate regulator configured to regulate a flow rate of the coolant flowing through the pipe, and
the temperature regulator regulates the temperature of the oxygen-containing gas in a manner that, in a case where the generated electric power is equal to or higher than a predetermined value, the temperature of the oxygen-containing gas becomes higher as the generated electric power increases.

2. The fuel cell system according to claim 1, wherein the flow rate regulator regulates the flow rate of the coolant in a manner that, in a case where the external temperature is equal to or lower than a predetermined temperature and if the generated electric power is equal to or higher than the predetermined value, the flow rate of the coolant supplied from the coolant supply machine to the liquid-cooled heat exchanger is increased.

3. The fuel cell system according to claim 1, wherein the flow rate regulator regulates the flow rate of the coolant in a manner that, in a case where the external temperature is higher than a predetermined temperature, the flow rate of the coolant supplied from the coolant supply machine to the liquid-cooled heat exchanger is decreased as the generated electric power by the fuel cell stack is increased.

4. The fuel cell system according to claim 1, further comprising:
an oxygen-containing gas temperature sensor configured to acquire an actual temperature of the oxygen-containing gas supplied from the liquid-cooled heat exchanger to the fuel cell stack through the gas pipe; and
a humidifier provided in the gas pipe and configured to humidify the oxygen-containing gas,
wherein the flow rate regulator regulates the flow rate of the coolant supplied from the coolant supply machine to the liquid-cooled heat exchanger, based on a difference between a target temperature of the oxygen-containing gas set based on the generated electric power of the fuel cell stack or a humidification state of the humidifier and the actual temperature acquired by the oxygen-containing gas temperature sensor.

5. The fuel cell system according to claim 1, further comprising:
an oxygen-containing gas temperature sensor configured to acquire an actual temperature of the oxygen-containing gas supplied from the liquid-cooled heat exchanger to the fuel cell stack through the gas pipe,
wherein the flow rate regulator regulates the flow rate of the coolant to be supplied from the coolant supply machine to the liquid-cooled heat exchanger based on the actual temperature acquired by the oxygen-containing gas temperature sensor.

6. The fuel cell system according to claim 1, wherein the oxygen-containing gas supply machine includes:

an air pump configured to compress air taken into the oxygen-containing gas supply machine and output the oxygen-containing gas having a high temperature; and an air-cooled intercooler configured to cool the oxygen-containing gas output from the air pump, wherein the oxygen-containing gas cooled by the air-cooled intercooler is supplied to the liquid-cooled heat exchanger.

7. The fuel cell system according to claim 6, wherein in a case where the air-cooled intercooler is operating normally, the temperature regulator stops the part of the coolant from flowing to the liquid-cooled heat exchanger.

8. A fuel cell system comprising:

a fuel cell stack configured to generate electric power by an electrochemical reaction between a fuel gas and an oxygen-containing gas;

an oxygen-containing gas supply machine configured to supply the oxygen-containing gas to the fuel cell stack;

a temperature regulator configured to regulate a temperature of the oxygen-containing gas supplied by the oxygen-containing gas supply machine;

an external temperature acquisition unit configured to acquire an external temperature of the fuel cell stack; and a generated electric power acquisition unit configured to acquire generated electric power of the fuel cell stack, wherein the temperature regulator regulates the temperature of the oxygen-containing gas in a manner that, in a case where the external temperature is lower than a predetermined temperature, the temperature of the oxygen-containing gas to be supplied to the fuel cell stack becomes higher as the generated electric power increases.

9. The fuel cell system according to claim 8, further comprising: an oxygen-containing gas temperature sensor configured to acquire an actual temperature of the oxygen-containing gas supplied from the liquid-cooled heat exchanger to the fuel cell stack through the gas pipe; and a humidifier provided in the gas pipe and configured to humidify the oxygen-containing gas, wherein the flow rate regulator regulates the flow rate of the coolant supplied from the coolant supply machine to the liquid-cooled heat exchanger, based on a difference between a target temperature of the oxygen-containing gas set based on the generated electric power of the fuel cell stack or a humidification state of the humidifier and the actual temperature acquired by the oxygen-containing gas temperature sensor.

* * * * *